United States Patent [19]

Heller

[11] 4,276,704
[45] Jul. 7, 1981

[54] RECORD BEARING ASSEMBLY FOR ENCAPSULATION OF A RECORD MEMBER, CAPSULE PART FOR A RECORD BEARING ASSEMBLY AND METHOD OF FABRICATION OF RECORD BEARING ASSEMBLY

[76] Inventor: Peter V. N. Heller, 3396 Calle La Veta, San Clemente, Calif. 92672

[21] Appl. No.: 938,975

[22] Filed: Sep. 1, 1978

[51] Int. Cl.³ .............................................. G09F 1/10
[52] U.S. Cl. ........................................ 40/159; 40/2.2; 40/10 D
[58] Field of Search ................ 40/152, 158 R, 158 B, 40/159, 22

[56] References Cited

U.S. PATENT DOCUMENTS

| | | | |
|---|---|---|---|
| 2,505,250 | 4/1950 | Kime et al. ............................. | 40/152 |
| 2,527,765 | 10/1950 | Roehrl .................................... | 40/159 |
| 2,843,955 | 7/1958 | Engelstein .............................. | 40/158 |
| 3,177,600 | 4/1965 | Wengel ................................... | 40/158 R |
| 3,195,257 | 7/1965 | Weihe ..................................... | 40/158 R |
| 3,291,669 | 12/1966 | Osher ...................................... | 40/158 R X |
| 3,357,121 | 12/1967 | Dorman .................................. | 40/158 R |

FOREIGN PATENT DOCUMENTS

| | | | |
|---|---|---|---|
| 685004 | 4/1964 | Canada ................................... | 40/158 R |
| 1400076 | 7/1975 | United Kingdom .................. | 205/0.82 |

*Primary Examiner*—Gene Mancene
*Assistant Examiner*—Wenceslao J. Contreras
*Attorney, Agent, or Firm*—Christie, Parker & Hale

[57] ABSTRACT

A record bearing assembly for encapsulating a planar record member. Included is a thin substantially flat base member comprising an aperture therethrough. A plastic capsule comprises as an integral part thereof the following: a thin substantially planar closed cavity is provided for a planar record member positioned within the perimeter of the aperture; first and second sides of the plastic capsule sandwich the base member therebetween around at least a portion of the capsule cavity; and a plurality of pegs are integral with and extend between the first and second sides stitching through the base member at a plurality of locations around at least a portion of the perimeter of the capsule cavity.

Also disclosed is a subcombination of a capsule part for use in forming the plastic capsule and a method for forming a record bearing assembly.

45 Claims, 18 Drawing Figures

RECORD BEARING ASSEMBLY FOR ENCAPSULATION OF A RECORD MEMBER, CAPSULE PART FOR A RECORD BEARING ASSEMBLY AND METHOD OF FABRICATION OF RECORD BEARING ASSEMBLY

BACKGROUND OF THE INVENTION

Embossed plastic cards are a necessary link in the chain of data handling in mercantile establishment, health care facilities, law enforcement facilities, and numerous other applications. It is also the instrument for imprinting documents such as sales drafts, hospital forms, traffic violations, etc. Significantly, it is recognized as an accurate and valid form of identification. Once imprinted, the information from the card enters a data stream for various uses as is generally known in the art.

There is a need for a secure, tamper proof, record bearing assembly in which a preprepared transparency, micro film or other man or machine readable record member is placed on an embossable base member for later enlargement, reproduction, or visible inspection. There is also a need to encapsulate the record member for protection against damage and against tampering.

The present methods of mounting encapsulating record members on a base member suffer from a number of disadvantages. The principal disadvantages are that they are difficult and costly to fabricate, and the encapsulation is relatively easy to enter, and either remove or replace the record member without subsequent detection.

SUMMARY OF THE INVENTION

Briefly, a preferred embodiment of the present invention is a record bearing assembly for encapsulating a planar record member. A thin, substantially flat base member comprises an aperture therethrough. A plastic capsule comprises, as an integral part thereof, the following: a thin substantially planar closed cavity is provided for a planar record member and is positioned within the perimeter of the aperture; first and second sides sandwich the base member therebetween around at least a portion of the capsule cavity; and a plurality of pegs integral with and between the first and second sides stitch through the base member at a plurality of locations around at least a portion of the perimeter of the capsule cavity. With such an arrangement, it is possible to provide a hermetically sealed cavity for the record member. Additionally, due to the configuration of the stitching and the closed cavity formed in the flat base member, the assembly is virtually tamper proof, making it extremely difficult to alter or change the record member without detection.

Preferably, the capsule comprises, as an integral part thereof, a joint between the first and second sides which forms a wall within and around the perimeter of the cavity, further adding to the security of the encapsulated record member.

A subcombination of the present invention is a plastic capsule part for forming one side of a capsule for a planar record member. The capsule part comprises as an integral part thereof, the following: first and second substantially opposite sides in which the first side has a planar surface for receipt of a planar record member for encapsulation; a substantially transparent window is provided through the opposite sides to the planar surface; and a part of a joint depends from the first side around the perimeter of the window and is of variable height around the perimeter of the window. Such a capsule part when combined with a further capsule part may be used for encapsulating a record member and mounting the same on a base member. Due to the varying height of the joint, even though joined with another joint, the structure makes it extremely difficult to enter without detection.

Preferably, the part of a joint is adjacent the planar surface and substantially intersects or even more preferably, intersects the plane of the planar surface. With such an arrangement, the planar record member is retained and aligned by the joint part over the planar surface during assembly.

Preferably, the part of a joint has a height which undulates relative to the first side.

Preferably, the joint has a top side with an ultrasonic energy director. The ultrasonic energy director allows two capsule parts to be easily and efficiently welded together to form an integral capsule.

The preferred embodiment of the present invention is a record bearing assembly for future encapsulation of a planar record member. A base member has a thin substantially flat capsule mounting portion and apertures through the capsule mounting portion. The apertures comprise a record member receiving aperture and, around the perimeter of the record member receiving aperture, a plurality of apertures for the receipt of pegs. An encapsulating member is affixed on the capsule mounting portion of the base member and is arranged for forming a capsule member. The encapsulating member includes: first and second substantially opposed but partially separable side portions; a partially closed cavity between the side portions and having first and second sides, each side portion having a planar surface extending into the partially closed cavity and the planar surfaces extending between the first and second sides and being spaced for receipt of a planar record member therebetween; a substantially transparent window extending through at least one of the opposed side portions to the planar surfaces; a part of a joint depending from each side portion and extending from one side of the sides of the cavity to the other around the perimeter of the window, the parts of a joint each being of variable height and complementary to the other so that a substantially continuous engagement is formed therebetween; and a plurality of pegs depending from at least one of the side portions towards the other side portion, the pegs and part of a joint being positioned and dimensioned so that each peg is extendable into a corresponding peg aperture in the base member and into engagement with the other side portion and each part of a joint is extendable into the document aperture of the base member.

With such an arrangement, the record member assembly can be partially preassembled and the record member added at a later time. The joint parts cooperate to retain the record member in place between the planar surface during the subsequent welding process. After addition of the record member, the separable side portions can be welded as needed to complete the encapsulation of the record member. The advantages of such construction are many. For example, the partially assembled parts can be shipped and handled as one unit rather than as separate pieces. Also it is easier to prevent theft of the partially assembled parts, than if the parts are handled separately.

DESCRIPTION OF THE DRAWINGS

FIG. 12 is a cross-sectional view of a portion of two capsule parts mounted and aligned on opposite sides of a base member. The capsule part depicted at the lower side of FIG. 12, is the capsule part depicted in FIG. 11.

DESCRIPTION

Figure 1:
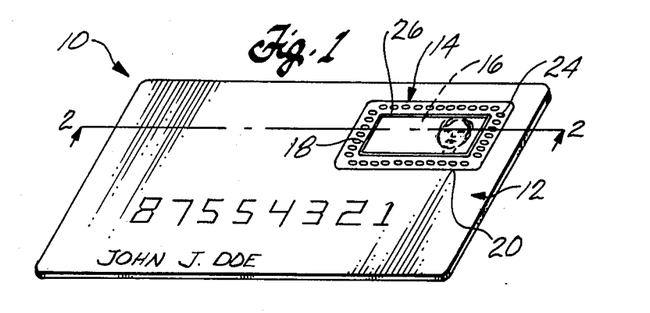
FIG. 1 is an isometric view of a record bearing assembly and embodies the present invention.
Figure 2:
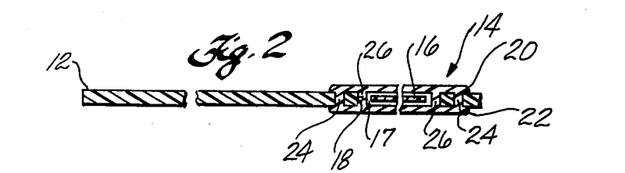
FIG. 2 is a cross-sectional view of the record bearing assembly of FIG. 1 taken along the lines 2—2 of FIG. 1.

FIGS. 1 and 2 depict a record bearing assembly 10 for encapsulating a planar record member which embodies the present invention. The record bearing assembly includes a base member 12, a capsule 14 mounted in the base member and a record member 16 contained within a hermetically sealed cavity of the capsule 14.

The base member 12 is a thin substantially flat member or card having an aperture 18. Preferably, the base member 12 is a thin parallelepiped plate and is made of an embossable poly vinyl chloride acetate material.

The capsule 14 is of a thermo-plastic material and is an integral unitary structure. The capsule contains a closed hermetically sealed thin cavity 17. Preferably the cavity is a parallelepiped, substantially planar, shaped for receipt of a planar record member 16 of similar size and shape. The cavity 17 is positioned within the perimeter of the aperture 18. The capsule has first and second opposite sides 20 and 22 which are an integral part of the capsule and sandwich the base member 12 therebetween around at least a portion of the capsule cavity. Integral with the sides 20 are a plurality of pegs 24 or extensions between the sides 20 and 22. The pegs form stitching through the base member 12 at a plurality of locations around at least a portion of and preferably completely around the entire perimeter of the capsule cavity. The base member completely surrounds each peg.

A joint 26 is an integral part of the capsule and forms a wall within and around the perimeter of the cavity. The joint is positioned within the aperture 18 of the base member close to the edge thereof.

The capsule is made of a plastic material. Preferably, the entire capsule is made of a clear plastic which is transparent throughout.

A number of advantages flow from the structure depicted in FIGS. 1 and 2. For example, the record bearing assembly is thin and generally planar and not much thicker than a normal credit card. Due to the transparency of the capsule and the overall shape and size of the record bearing assembly, it is possible to insert the record bearing assembly into a conventional reader so that the record member can be enlarged and displayed or reproduced as desired. As a result, the record member may be a transparency of any type, micro film, or an opaque document with surface indicia.

Significantly, the construction preserves the inspectable integrity of the record bearing assembly. Due to the stitching and the integral joint, it is virtually impossible to tamper with or enter the cavity without detection. In this regard, should any of the pegs be severed or should the joint be cut open, for example with a razor blade, such tampering could easily be detected by a normal visual inspection or after a photographic enlargement has been obtained of the capsule and the record member.

Not only would it be difficult to enter and replace a record member within the capsule, it would be extremely difficult to replace the entire capsule due to the fact that the capsule is, in effect, an integral part of the base member 12 due to the stitching and joint.

Figures 6, 7, 8, 9:
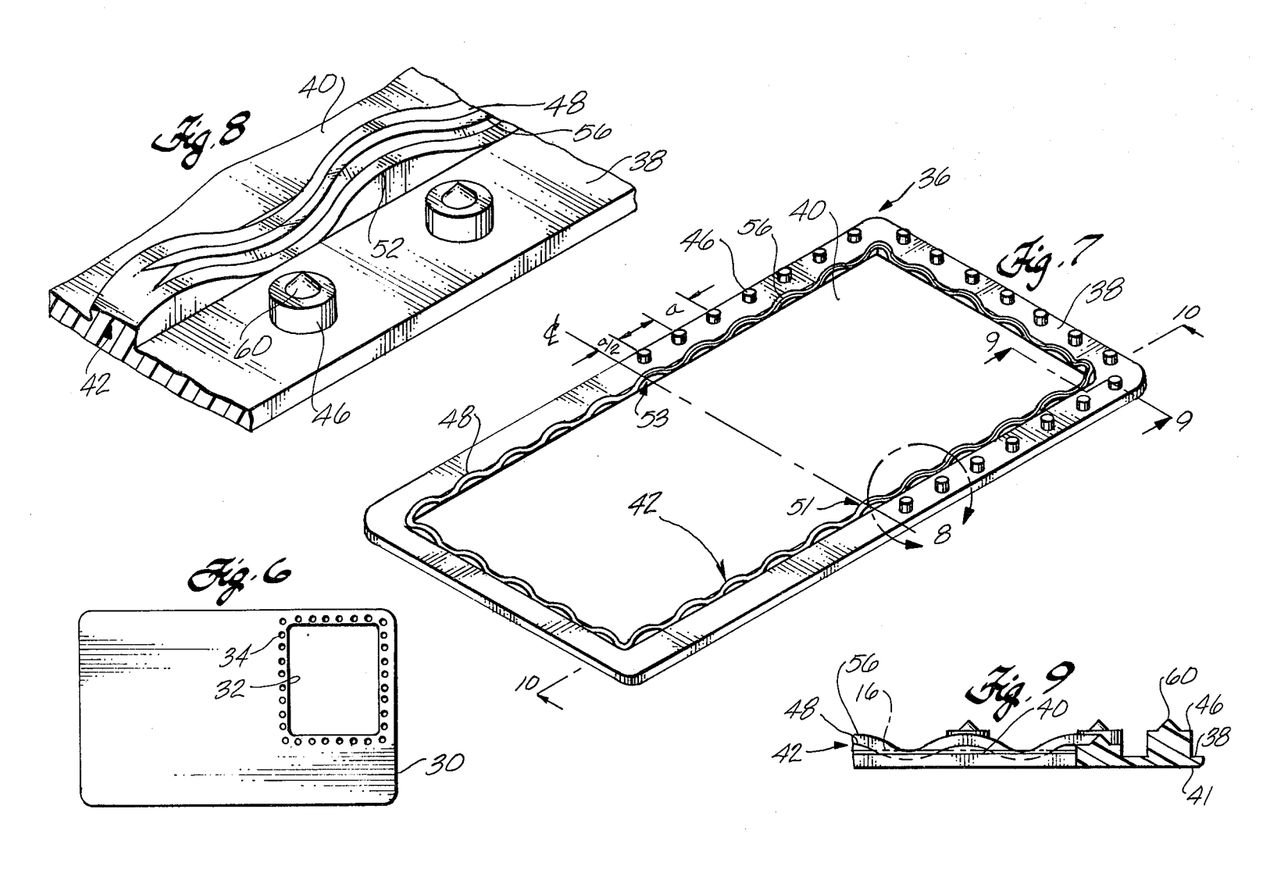
FIG. 6 is a front elevation view of a base member which may be used in fabricating the record bearing assembly according to the present invention.
FIG. 7 is an enlarged isometric view of a capsule part for use in conjunction with the base member of FIG. 6 for fabricating a record bearing assembly and embodying the present invention.
FIG. 8 is an enlarged sectional view of the capsule part taken at 8—8 of FIG. 7.
FIG. 9 is a cross-sectional view of the capsule part of FIG. 7 taken along the lines 9—9.

Consider now, in more detail, the components from which the record bearing assembly of FIGS. 1 and 2 can be formed, with reference to FIGS. 6–10. FIG. 6 depicts a thin, substantially flat base member 30 which is very similar to that of FIG. 1. Similar to the base member 12 of FIG. 1, the base member 30 has an aperture 32 extending therethrough. The aperture 32 similar to that of FIG. 1, is rectangular in configuration, however the rectangular aperture of FIG. 6 has been rotated 90° with respect to that depicted in FIG. 1. Around the perimeter of the aperture 32 there is provided a plurality of small round peg receiving apertures 34 extending through the base member. The apertures 34 are essentially of the same diameter but slightly larger than that of pegs which extend through the apertures.

FIGS. 7–10 depict one half of an encapsulating member referred to herein as capsule part 36. The capsule part 36 has oppositely facing sides 38 and 41. Preferably, the opposite sides 38 and 41 form a thin, substantially parallelepiped shaped structure, and therefore the capsule part 36 is quite thin between the sides.

A planar surface 40 is provided for receipt of the planar record member. Preferably, the planar surface 40 is rectangular and centrally positioned within the perimeter of the side 38. Although not essential for both capsule parts forming the complete capsule, at least one of the capsule parts has a transparent window over the area of surface 40 through the opposite sides 38 and 41 to the planar surface 40. The capsule part 36 has a wall 42 (referred to herein as joint part 42) which forms part of a joint depending from the side 38 and which extends around the perimeter of the planar surface 40. Significantly, the joint part 42 is of variable height around the perimeter of and relative to the planar surface 40. A plurality of cylindrical shaped pegs 46 depend from the side 38 and are positioned between the perimeter of the joint part 42 and the outer perimeter of the side 38.

The capsule part 36 is arranged so that two identical capsule parts can be formed and mounted on opposite sides of the base member 30. To this end, the pegs and joint part of each of the identical capsule parts are positioned and dimensioned so that, with the capsule parts positioned in opposed relation on opposite sides of the base member, each peg extends into a corresponding peg hole 34 in the base member and into engagement with the other capsule part. Additionally, each joint part is within the perimeter of and at least partially extends into the document aperture 32. Each joint part is adapted for forming a substantially continuous engagement with the joint part of the other capsule.

Figure 10:
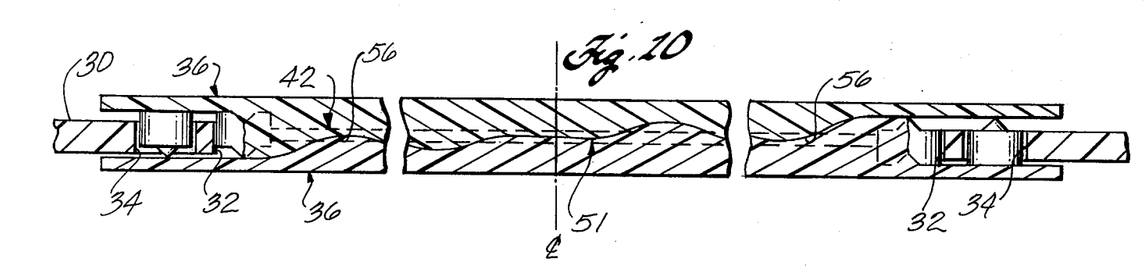
FIG. 10 is an enlarged cross-sectional view of two capsule parts as depicted in FIG. 7 taken along the lines 10—10 with the two capsule parts in opposed relationship properly aligned on opposite sides of the record member of FIG. 6 ready for welding together. Sections have been broken away.

Preferably, the top edge 48 of the joint part 42 as seen from the side in FIGS. 7, 8 and 9, undulates relative to the side 38 and hence the planar surface 40 and has a relatively smooth, generally sinusoidal pattern. By way of example, to achieve the symmetry discussed above, the capsule part 36 of FIG. 7 has ten and one half generally symmetrical and reccurring peaks and valleys along the long sides and in five generally symmetrical reoccurring peaks and valleys along the short sides. Additionally, the right hand corners of the joint part 42 form high points whereas the corners at the left hand side of FIG. 7 are low points. Additionally, the pegs are disposed in a generally C-shaped pattern, symmetrically about the right hand half of the center line depicted in FIG. 10. The pegs 46 are preferably evenly spaced apart by a distance "a" and the space between the center line and the adjacent peg is one half (i.e. a/2) of the distance between two adjacent pegs. With this configuration, a second identical capsule part 36 can be made rotated 180° around its long dimension as seen in FIG. 7 and overlaid over the first capsule part so that the joint parts 42 of each are aligned and facing each other, and the pegs of the two capsule parts are at opposite ends. When the capsule parts are so aligned on opposite sides of the base member of FIG. 6, the pegs and joint parts can be aligned and inserted into the apertures 32 and 34 of the base member. FIG. 10 is a cross-sectional view of two capsule parts 36 overlaid in the manner described depicting the corresponding section of the base member 30.

According to the preferred embodiment of the invention, the joint part 42 has a side wall 50 adjacent the planar surface 40 which extends to a generally flat top side 48. The side wall 50 has a top edge 52 joining the top side 48 which is of variable height relative to the planar surface 40 at a plurality of positions 55. Preferably as depicted in FIG. 8, the top edge 52 intersects and extends below the planar surface 40. To be discussed in more detail, this aids in maintaining a record member (such as 16 in FIG. 1) within the boundaries of the joint part 42 during assembly of the record bearing assembly. In this regard, it is important that the edge 52 of the two capsule parts transverse past the plane of the record member. This allows the joint parts from both capsule parts to separately traverse the plane of the record member and retain the record member during the fabrication steps.

In addition to locating the record member 16, the undulating joint part 42 is a significant aid in accurately aligning the two capsule parts and holding them in place during assembly.

Preferably, the capsule parts 36 are joined together through the pegs and joint parts using pressure and ultrasonic energy. To this end, the top side 48, carries an ultrasonic energy director 56 in the form of a sharp wedge-shaped edge. The energy director 56 undulates along with the top 48.

As generally depicted in FIGS. 7 and 10, the energy director extends substantially 50 percent of the way around the planar surface 40 extending in a generally C-shape entirely around the right hand side of the center line. The top side 48 of the joint part 42 to the left of the center line depicted in FIG. 7 is flat in a transverse direction. A gradual tapered transition from the energy director to the flat surface exists at 51 and 53. In this manner, when the joint parts are overlaid as depicted in FIG. 10 the energy director 56 mates with a flat surface 48 in the other capsule part.

Preferably, each of the pegs 46 also comprises an energy director 60 and the end which is opposite from the side 38. The energy director 60 is pointed and conically shaped.

To be explained in more detail, the capsule parts are joined together using pressure and ultrasonics, which cause the energy directors 56 and 60 to become energized and start flowing outwardly from the sharp points and edges thereby joining adjacent surfaces and becoming an integral part of the opposite capsule part, as depicted in the cross-sectional view of FIG. 2. For example, the pegs 46 will become an integral part of side 38 of each capsule part and the joint parts 42 on each capsule part will become an integral part of each other whereby completely hermetically sealing and encapsulating a cavity between the planar surfaces 40 of the two capsule parts. In this manner, a record bearing member is formed in which the capsule is formed through and locked into the base member, the pegs 46 extending through the apertures and the joint extending around the inside perimeter of the aperture in the base member in the manner described with reference to FIG. 2. In addition to forming a joint between the capsule parts, the undulating joint parts provide an irregular side pattern even after ultrasonic welding which prevents undetected entry into the cavity. Although the undulating pattern is preferred, due to the ease of manufacture and the fact that it lends itself readily to ultrasonic welding, the varying height of the joint part might be rectangular or triangular in shape.

Figures 11, 13:
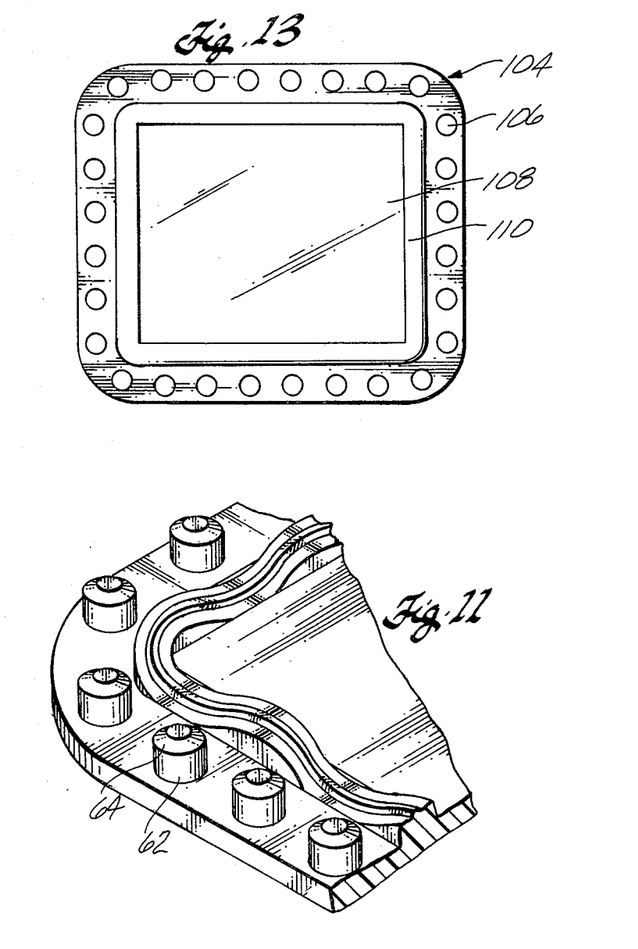
FIG. 11 is an isometric view of the corner of an alternate capsule part for use in the assembly of FIG. 12 and embodying the present invention.
FIG. 13 is an elevation view of one side of an alternate capsule part embodying the present invention.

Although the pegs 46 are depicted as cylindrical in shape, various other shapes might be used within the scope of the present invention. For example, the pegs may be square or hex or might be of various shapes, so as to provide some type of coded identification. Also as depicted in FIGS. 11 and 12, pegs may be provided on each of the two capsule parts forming a capsule with the pegs on one side tubular shaped as at 62, and the pegs on the other side cylindrical shaped as at 66. In this regard, pegs 62 are tubular shaped with a semi-conical shaped upper surface 64 forming an ultrasonic energy director. Significantly the invention also lends itself to color coding. For example, the ends of the pegs and the top side of the joint parts could be colored with dye. During ultrasonic welding the dye would be diffused along with the melted plastic and form an integral part of the capsule. This adds further to the detectable integrity of the assembly since any cutting or other tampering could easily be detected.

Figure 3:
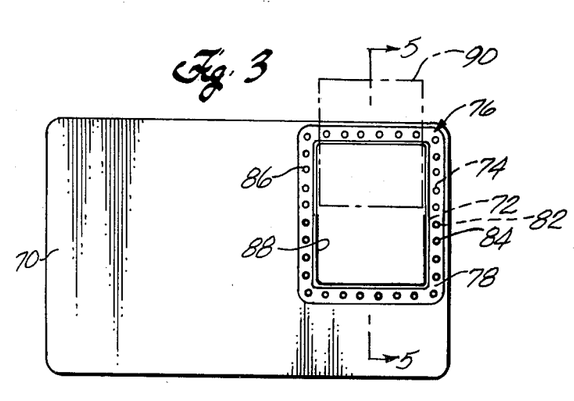
FIG. 3 is a front elevation view, partially in schematic form, of an alternate record bearing assembly in which a record member may be inserted into an encapsulating member.
Figure 4:
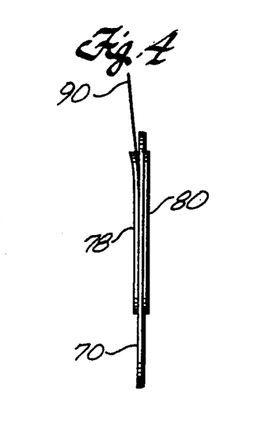
FIG. 4 is a side elevation view of the record bearing assembly of FIG. 3.
Figure 5:
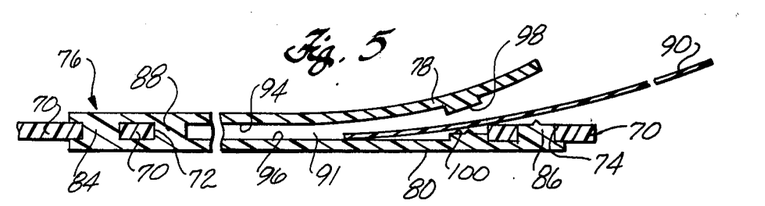
FIG. 5 is a cross-sectional view of the record bearing assembly taken along the lines 5—5 of FIG. 3.

Refer now to FIGS. 3-5 which depict an alternate embodiment of the invention wherein the encapsulating member and base member are partially preassembled.

Depicted is a base member 70 similar to the base member of FIG. 6. The base member is a thin substantially flat member, with apertures therethrough. The apertures include a document receiving aperture 72, of a rectangular shape as viewed in FIG. 3, and a plurality of circular peg receiving apertures 74 extending in a rectangular configuration around the perimeter of the aperture 72.

A plastic encapsulating member 76 is affixed on the base mounting member 70 and is adapted for forming a capsule member with a cavity at 91 in which a record member such as 90 may be encapsulated. The encapsulating member 76 is formed from two capsule parts virtually identical to that depicted in FIG. 7 except that a different number of pegs are employed. For purposes of discussion the capsule parts at the top and bottom of the base member as seen in FIG. 3 are identified as capsule parts 78 and 80 respectively, even though they have been partially joined.

The pegs 84 originally affixed only to the upper capsule part 78 are depicted by heavy circled lines in FIG. 3 at the lower portion of the capsule part 78, whereas the pegs 86 affixed to the lower capsule part 80 are indicated by thinner circled lines.

After positioning the upper and lower capsule parts 78 and 80 on opposite sides of the base member 70 only the lower portion of the capsule parts as seen in FIG. 3 are ultrasonically welded together. To this end, only the joint parts and the pegs 84 are welded to the opposite capsule part. In this manner, the joint parts on each of the capsule parts are integrally joined to form a solid joint 88 extending from capsule part 78 to capsule part 80 and pegs 84 form an integral part of both the upper capsule part 78 and the lower capsule part 80.

With this configuration, the upper capsule part 78 can be opened slightly as depicted in FIGS. 4 and 5 and a record member such as that depicted at 90 slipped in the cavity 91 between the planar surfaces 94 and 96 of the capsule parts 78 and 80. After the record member 90 is inserted between the surfaces 94 and 96, the unwelded joint parts 98 and 100 and the unwelded pegs 86 at the upper part of FIG. 3 are brought into contact with the opposite capsule part and welded together. With this configuration, the record bearing assembly can be partially preassembled so that it can be handled as a single unit without having to process three different parts, including the record member and the two capsule parts and maintaining set accountability.

FIG. 13 depicts an alternate capsule part in which the pegs 106 extend in a rectangular pattern completely around a rectangular shaped planar document receiving surface 108. A joint part 110 of the general type discussed above extends around the perimeter of the planar document receiving area 108. Although such a capsule part may be employed, the opposite capsule part would be different so that the two capsule parts would properly fit together. For example, the opposite capsule part would employ no pegs or the pegs of two capsule parts would have to be of the type depicted in FIGS. 10 and 11. Additionally the energy director could extend completely around the perimeter of the document receiving area on one capsule part and be eliminated entirely on the other. Alternately, every other peg could be eliminated on the capsule part of FIG. 13 and formed on the opposite capsule part, so as to be interleafed when assembled.

Figure 14:
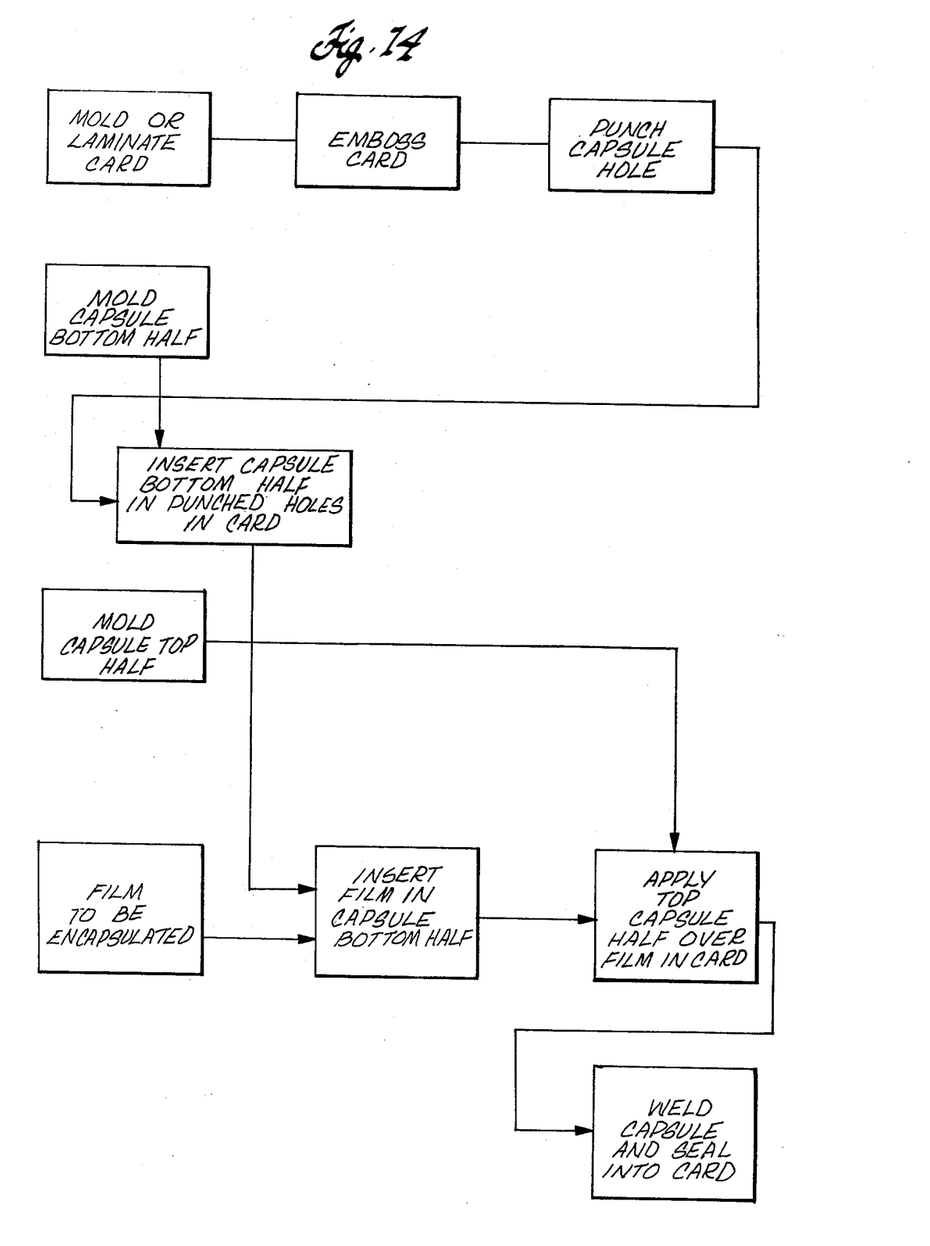
FIG. 14 is a flow diagram depicting a method for assembly of a record bearing assembly for encapsulating a planar record member and embodying the present invention.

Consider now the method depicted in FIG. 14 for fabricating a record member assembly of the type depicted in FIG. 1. The base member, referred to in this discussion as a card, is molded or laminated using conventional techniques, out of a poly vinyl chloride material which is embossable to allow formation of raised typical embossed lettering and numbering as depicted by way of example on the base member of FIG. 1, or other indicia. Apertures or holes are punched in the card forming a configuration of peg holes and a record member receiving aperture similar to that depicted in FIG. 6.

Two capsule parts are formed. In the following discussion, the two capsule parts are referred to as the capsule bottom half and the capsule top half.

Subsequently, the capsule bottom half is inserted so that the pegs thereof extend into the peg holes and the joint part extends into the record member hole of the punched card.

The record member, referred to in this discussion as the film to be encapsulated, is then inserted onto the capsule bottom half on the punched card. In this regard, the film is inserted within the boundaries of the joint part and on the planar record member surface, the joint part aligning and retaining the film in place. Subsequently, the capsule top half is mounted on the opposite side of the card from the capsule bottom half and is aligned so that each peg thereof extends into a corresponding peg aperture or hole in the base member and into engagement with the capsule bottom half and the joint part thereof extends into the record member hole and into engagement with the joint part of the capsule bottom half. The capsule top half is now positioned over the film. Subsequently, the two capsule parts are welded and sealed into the card simultaneously sealing the film in the cavity formed therebetween.

Figure 16:
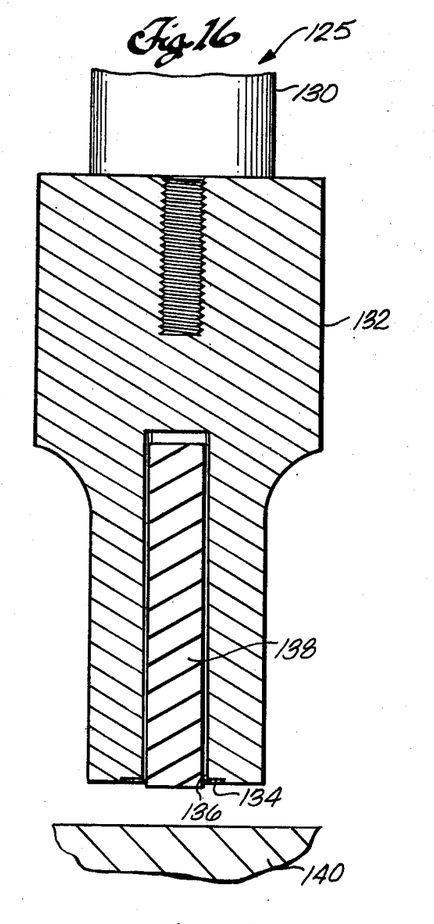
FIG. 16 is a schematic diagram partially in cross section depicting an ultrasonic welder for use in fabricating the record bearing assembly of FIG. 1.
Figure 17:
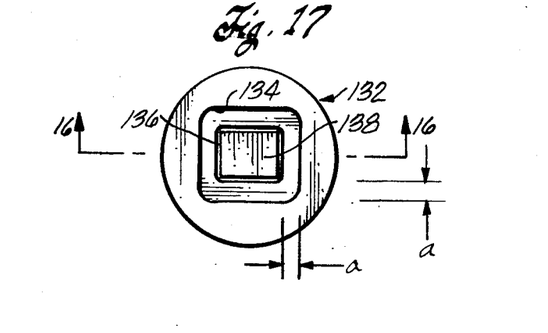
FIG. 17 is an end view of the ultrasonic horn depicted in cross section in FIG. 16.

Consider now the way in which the capsule parts are welded. FIG. 16 is a schematic partially cross-sectional view of an ultrasonic welding machine 125. The ultrasonic welding machine contains an ultrasonic generator depicted schematically at 130 and an ultrasonic horn 132. The ultrasonic horn has a rectangular recessed area 134 machined at the bottom end, as depicted in FIGS. 16 and 17, which is of the same rectangular shape and configuration as the outside perimeter of the opposing sides of the capsule parts to be welded. Thus, the perimeter of the recessed area 134 is slightly larger than, and virtually identical in shape to the outside perimeter of the capsule part viewed, for example, as in FIG. 7. A rectangular opening 136 is machined down the center of the horn 132 and is of generally the same size and shape as the central planar record member surface in the capsule part. A rubber core 138 is positioned within the opening 136 and is pinned at its base at the nodal point of the horn and extends a short distance beyond the lower end of the horn as seen in FIG. 16. During the last step of the method of fabricating the record member assembly as discussed in connection with FIG. 14, the assembled but unwelded card, the capsule top half, the capsule bottom half, and the film are positioned below the lower end of the horn 132 on a base plate 140 with the perimeter of the capsule parts aligned within the perimeter of the recessed area 134. Next, the horn 132 is lowered, applying pressure and ultrasonic energy between the capsule top half and capsule bottom half. In this regard, the downward facing surface of the recess 134, and the base plate 140 apply pressure and ultrasonic energy between the capsule halves through the pegs and joint parts causing the energy directors thereon to heat and melt outwardly from the pointed and sharp edges until the pegs and joint parts form an integral part of the opposite capsule part. The rubber core 138 applies accoustical dampening pressure to the central portion of the capsule parts preventing tympanic damage to the window or record member.

Figure 15:
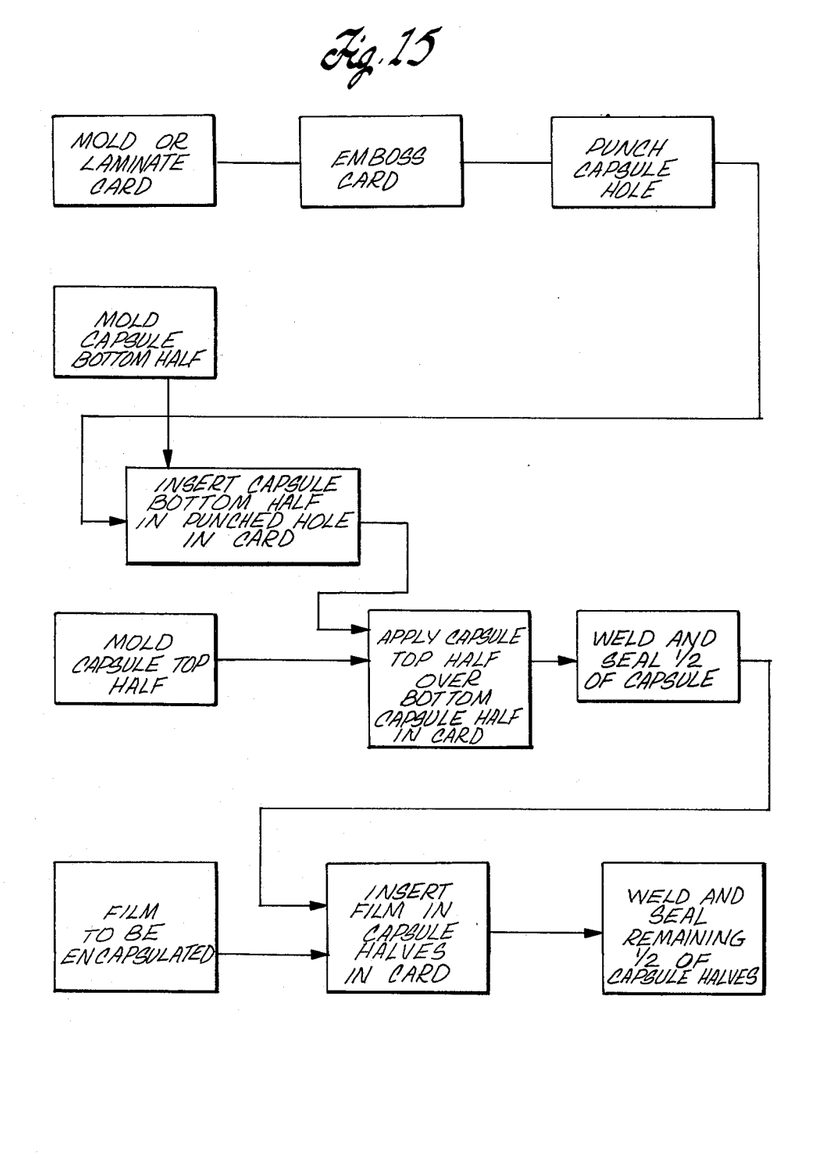
FIG. 15 is a flow diagram depicting an alternate method for fabricating a record bearing assembly for later encapsulating a planar record member and embodying the present invention.

Consider now the method for assembly of a record bearing assembly which can be used for subsequent insertion of a planar record member. FIG. 15 depicts the steps of molding or laminating the card, embossing the card, punching holes in the card, molding of the capsule bottom half and molding of the capsule top half, all identical to that described in connection with FIG. 14.

Subsequently, the capsule bottom half is mounted with the peg holes thereof inserted into the corresponding peg holes of the card. In contrast to the sequence of steps discussed with respect to FIG. 14, the capsule top half is applied over the capsule bottom half in the card without prior insertion of the film. Subsequently, approximately one half of the capsule top half and capsule bottom half are welded together. At this point, a record member assembly of the type depicted in FIGS. 3–5 is formed. At a later time, for example after the assembly has been shipped to a customer and film has been inserted, the unwelded portion of the capsule halves can be welded together as in the method of FIG. 14.

Figure 18:
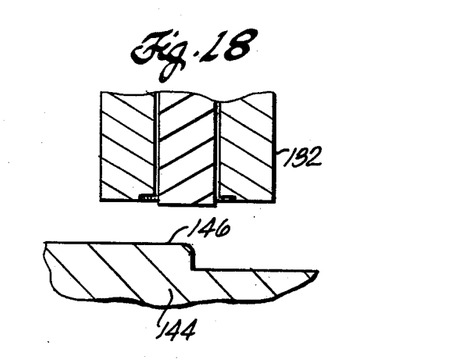
FIG. 18 is a cross-sectional view of the lower end of an ultrasonic horn and the adjacent base plate for use in assembly of the record bearing assembly in FIG. 3.
Figure 22:
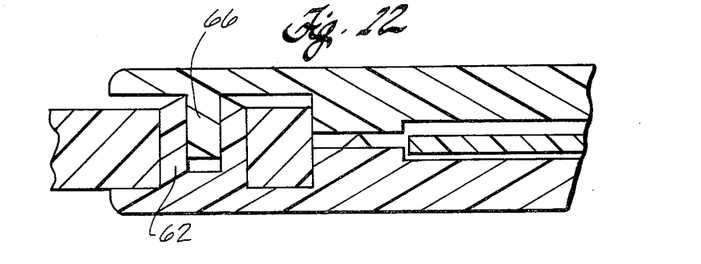

FIG. 18 depicts a modification of the ultrasonic welder of FIGS. 16, 17 for welding only one half of the capsule halves. As depicted in FIG. 18, a base member 144 is provided which is radius relieved downwardly, at approximately the mid point, away from the horn 132 leaving a higher portion 146. As a result, when the assembly, including the card, capsule top half, and capsule bottom half, is inserted between the horn 132 and the base member 144 and the horn 132 is brought down into engagement for welding, only the portions of the capsule halves which are between the upper higher portion 146 and the horn 132 are welded.

It is important to note that during the application of pressure and ultrasonic welding, the capsule parts would naturally tend to move out of alignment if it were not for the variable height, undulating joint parts. However, due to the fact that the joint parts of the two capsule parts are complementary, the peaks of each capsule part extend into the valleys of the other capsule part, thereby locking the capsule parts together in transverse directions. In this regard, the joint parts extend completely around the perimeter of the planar surface (and window) with peaks and valleys along both the long and short side of the joint part.

What is claimed is:

1. A record bearing assembly for encapsulating a planar record member comprising:
   a thin substantially flat base member comprising an aperture therethrough;
   a plastic capsule comprising as an integral part thereof
      a thin substantially planar closed cavity for such a planar record member positioned within the perimeter of the aperture, first and second sides sandwiching the base member therebetween substantially completely around the capsule cavity,
      a wall connected between the first and second sides and extending within the aperture of the base member completely around the perimeter of the cavity, and
      a plurality of pegs integral with and extending between the first and second sides stitching through the base member at a plurality of locations substantially completely around the perimeter of the capsule cavity.

2. A plastic capsule part for forming one side of a capsule for a planar record member, the capsule part comprising:
   first and second substantially opposite sides, the first side comprising a planar surface for receipt of a planar record member for encapsulation;
   a substantially transparent window through the capsule part between the opposite sides to the planar surface; and
   a wall depending from the first side completely around the perimeter of the window, the wall being of variable height therealong around the perimeter of the window.

3. A plastic capsule part according to claim 2 wherein the wall has, adjacent the planar surface, a side wall with a top edge which at least substantially intersects the plane of the planar surface at a plurality of positions to thereby provide said variable height for the wall.

4. A plastic capsule part according to claim 2 wherein the height of the wall undulates therealong relative to the first side.

5. A plastic capsule part according to claim 4 wherein the wall has, adjacent the planar surface, a side wall with a top edge which at least substantially intersects the plane of the planar surface at a plurality of positions.

6. A plastic capsule part according to claim 5 wherein the top edge of the wall undulates past the plane of the planar surface at a plurality of positions.

7. A plastic capsule part according to claim 2 wherein the wall has a top side and has a side extending from the top side to the first side said top side providing said variable height of the wall.

8. A capsule part according to claim 2 wherein the wall has a top side and an ultrasonic energy director along at least a portion of the top side.

9. A capsule part according to claim 8 wherein the top side of the wall has a substantially sharp edge which undulates toward and away from the first side and comprises the ultrasonic energy director.

10. A capsule according to claim 9 wherein the energy director extends substantially 50 percent of the way around the window.

11. A plastic capsule part according to claim 2 wherein the wall has a top side and wherein the capsule part has one half thereof in which the wall is symmetrical and complementary to the other half such that with the walls of two of such capsule parts in alignment and the top side thereof in engagement a substantially continuous engagement can be formed between the walls on the two capsule parts.

12. A plastic capsule according to claim 2 wherein the capsule part is substantially transparent between substantially the entire first and second sides.

13. A plastic capsule part according to claim 2 wherein the wall has a substantially rectangular shaped perimeter completely around the window.

14. A plastic capsule part according to claim 13 wherein both the inner and outer perimeters of the wall are rectangular shaped.

15. A plastic capsule part for forming one side of a capsule for a planar record member, the capsule part comprising:
 first and second substantially opposite sides, the first side comprising a planar surface for receipt of a planar record member for encapsulation;
 a substantially transparent window through the capsule part to the planar surface;
 a wall depending from the first side completely around the perimeter of the window, the wall being of variable height therealong around the perimeter of the window; and
 a plurality of pegs depending from the first side and positioned between the perimeter of the wall and the outer perimeter of the first side and extending around a substantial portion of the perimeter of the wall.

16. A plastic capsule part according to claim 15 wherein the wall has, adjacent the planar surface, a side wall with a top edge which at least substantially intersects the plane of the planar surface at a plurality of positions to thereby provide said variable height for the wall.

17. A plastic capsule part according to claim 15 wherein the height of the wall undulates therealong relative to the first side.

18. A plastic capsule part according to claim 17 wherein the wall has, adjacent the planar surface, a side wall with a top edge which at least substantially intersects the plane of the planar surface at a plurality of positions.

19. A plastic capsule part according to claim 18 wherein the top edge of the part of a joint undulates past the plane of the planar surface at a plurality of positions.

20. A plastic capsule part according to claim 15 wherein the wall has a top side and has a side extending from the top side to the first side said top side providing the variable height of the wall.

21. A capsule part according to claim 15 wherein the wall has a top side and an ultrasonic energy director along at least a portion of the top side.

22. A capsule part according to claim 21 wherein the top side of the wall has a substantially sharp edge which undulates therealong toward and away from the first side and comprises the ultrasonic energy director.

23. A capsule according to claim 22 wherein the energy director extends substantially 50 percent of the way around the window.

24. A plastic capsule part according to claim 15 wherein the wall has a top side and wherein the capsule part has one half thereof in which the wall is symmetrical and complementary to the other half such that with the walls of two such capsule parts in alignment and the top sides thereof in engagement a substantially continuous engagement can be formed between the walls on the two capsule parts.

25. A plastic capsule according to claim 15 wherein the capsule is substantially transparent between substantially the entire first and second sides.

26. A plastic capsule part according to claim 15 wherein the wall has a substantially rectangular shaped perimeter completely around the window.

27. A plastic capsule part according to claim 26 wherein both the inner and outer perimeter of the wall are substantially rectangular shaped.

28. A capsule part according to claim 15 wherein the pegs each comprise an ultrasonic energy director on an end thereof opposite from the first side.

29. A capsule part according to claim 28 wherein the pegs each comprise a substantially pointed end comprising the ultrasonic energy director.

30. A record bearing assembly for future encapsulation of a planar record member comprising:
 a base member having a thin substantially flat capsule mounting portion and apertures through the capsule mounting portion, the apertures comprising a record member receiving aperture and, substantially completely around the perimeter of the record member receiving aperture, a plurality of apertures for the receipt of pegs;
 an encapsulating member affixed on the capsule mounting portion of the base member, the encapsulating member comprising:
  first and second substantially opposed but partially separable side portions, a partially closed cavity between the side portions and having first and second sides, each side portion having a planar surface in opposed relation to the other planar surface in the partially closed cavity, the planar surfaces being spaced for receipt of a planar record member therebetween, a substantially transparent window through at least one of the opposed side portions to the planar surface thereof, a wall depending from each side portion completely around the perimeter of the window and within the perimeter of the record member aperture, the side portions defining therebetween a partially open portion of the cavity, the wall being separable at the partially open portion to form a wall portion on each side portion, each wall portion being of variable height therealong and complementary to the other wall portion so that a substantially continuous engagement may be formed therebetween, and a plurality of pegs depending from at least one of the side portions toward the other side portion completely around the perimeter of the record member aperture, the pegs and wall being positioned and dimensioned so that each peg either extends or is extendable into a corresponding peg aperture in the base member and into engagement with the other side portion.

31. A record bearing assembly for encapsulating a planar record member comprising:
 a base member having a thin substantially flat capsule mounting portion and apertures through the capsule mounting portion, the apertures comprising a record member receiving aperture and, substantially completely around the perimeter of the record member receiving aperture, a plurality of apertures for the receipt of pegs;
 first and second plastic capsule parts for mounting on opposite side of the capsule mounting portion and for forming a capsule member, each capsule part comprising:

first and second substantially opposite sides, the first side comprising a planar surface for receipt of a planar record member for encapsulation;

a substantially transparent window through the capsule member to the planar surface, a wall, for forming a part of a joint to the wall of the other capsule part, the wall depending from the first side around the perimeter of the planar surface, the wall being of variable height therealong; and a plurality of pegs, in at least one of the capsule parts, depending from the first side and positioned between the outer perimeter of the wall and the outer perimeter of the first side, the pegs, in the at least one of the capsule parts, and wall of each capsule part being positioned and dimensioned so that, with the first and second capsule parts positioned in opposed relation on opposite sides of the capsule mounting portion, each peg is extendable into a corresponding peg hole in the base member and into engagement with the other capsule part, and each wall is at least partially extendable into the document aperture of the base member and is engageable with the wall of the other capsule part.

32. A record member assembly according to claim 31 wherein in each capsule part the wall has, adjacent the planar surface thereof, a side wall with a top edge which at least substantially intersects the plane of the planar surface at a plurality of positions to thereby provide the variable height for the wall.

33. A record member assembly according to claim 31 wherein in each capsule part the height of the wall undulates therealong relative to the first side.

34. A record member assembly according to claim 33 wherein in each capsule part the wall has, adjacent the planar surface, a side wall with a top edge which at least substantially intersects the plane of the planar surface at a plurality of positions.

35. A record member assembly according to claim 34 wherein in each capsule part the top edge of the part of the wall thereof undulates past the plane of the planar surface at a plurality of positions.

36. A record member assembly according to claim 31 wherein in each capsule part the wall has a top side and has a side extending from the top side to the first side.

37. A record member assembly according to claim 31 wherein the wall has a top side and an ultrasonic energy director along at least a portion of the top side.

38. A record member assembly according to claim 37 wherein in each capsule part the top side of the wall has a substantially sharp edge which undulates therealong toward and away from the first side and comprises the ultrasonic energy director.

39. A record member assembly according to claim 38 wherein in each capsule part the energy director extends substantially 50 percent of the way around the window.

40. A record member assembly according to claim 31 wherein in each capsule part the wall thereof has a top side and wherein the capsule part has one half thereof in which the wall is symmetrical and complementary to the other half such that with the walls of both such capsule parts in alignment and the top sides thereof in engagement a substantially continuous engagement can be formed between the tops of the walls.

41. A record member assembly according to claim 31 wherein at least one of the capsule parts is substantially transparent between substantially the entire first and second sides.

42. A record member assembly according to claim 31 wherein in each capsule part the wall has a substantially rectangular shaped perimeter completely around the window.

43. A record member assembly according to claim 42 wherein in each capsule part both the inner and outer perimeters of the wall are rectangular shaped.

44. A record member assembly according to claim 31 wherein in each capsule part the pegs each comprise an ultrasonic energy director on an end thereof opposite from the first side.

45. A record member assembly according to claim 44 wherein the pegs each comprise a substantially pointed end comprising the ultrasonic energy director.

* * * * *

UNITED STATES PATENT AND TRADEMARK OFFICE
CERTIFICATE OF CORRECTION

PATENT NO. : 4,276,704
DATED : July 7, 1981
INVENTOR(S) : Peter V. N. Heller

It is certified that error appears in the above—identified patent and that said Letters Patent is hereby corrected as shown below:

Correct the inventor's address to

-- 213 Esplanade, San Clemente, CA 92672 --

Column 6, line 34, "and" should be -- at --;
Column 6, line 47, "whereby" should be -- thereby --;
Column 12, line 68, "side" should be -- sides --;

Signed and Sealed this

Fourth Day of May 1982

[SEAL]

Attest:

GERALD J. MOSSINGHOFF

Attesting Officer        Commissioner of Patents and Trademarks